Feb. 22, 1966  C. F. QUICK  3,236,310
SELF-FITTING BOOT TYPE HORSE SHOE
Filed Nov. 15, 1963  2 Sheets-Sheet 1

INVENTOR.
CARL F. QUICK
BY Alfred W. Petchaft
ATTORNEY

Feb. 22, 1966   C. F. QUICK   3,236,310
SELF-FITTING BOOT TYPE HORSE SHOE

Filed Nov. 15, 1963   2 Sheets-Sheet 2

INVENTOR.
CARL F. QUICK
BY
*Alfred W. Petchaft*
ATTORNEY

United States Patent Office 3,236,310
Patented Feb. 22, 1966

3,236,310
SELF-FITTING BOOT TYPE HORSE SHOE
Carl F. Quick, 11147 Pritchard Drive,
St. Louis County 36, Mo.
Filed Nov. 15, 1963, Ser. No. 323,937
17 Claims. (Cl. 168—18)

The present invention relates in general to certain new and useful improvements in horse shoes, and the like, and, more particularly, to means and methods for strengthening, reinforcing, and shoeing the hoofs of horses and other hooved animals.

The shoeing of horses hoofs is a complex and highly specialized art. The choice of the wrong type of shoe or the use of shoes of improper size and shape can have very bad effects on the horse. Such shoes can, for example, cause the horse to work improperly or disable the horse completely. Improper shoes can cause lameness, loss of speed, defective gaits, and even various kinds of hoof maladies. On the other hand, horses that have gait-defects aberrations in running, and hoof-maladies often can be cured by being properly shod. Another factor which must be taken into account in farriery is the need for changing shoes at frequent intervals to meet different conditions in the track road or surface over which the horse must work. Different types of shoes are often necessary for hard tracks as compared with soft tracks. Similarly, different types of shoes are needed at different seasons of the year. Finally, the hoofs of each horse are almost as individual as the fingerprints of a human hand so that each set of shoes must be specially fitted with great precision and care. Failure to do this, again, can have adverse effects on the horse's action and physical well-being. Consequently, a blacksmith who engages in horse-shoeing must be a highly skilled, experienced specialist. Unfortunately, the sharply diminished horse population in the United States has resulted in a gradual disappearance of skilled blacksmiths since the economic incentive is no longer present. Consequently, in recent years, it has become very difficult, if not well-nigh impossible to have a horse properly shod.

It is, therefore, the primary object of the present invention to provide novel means and methods for shoeing horses and other similar hooved animals which are simple, convenient, and relatively inexpensive.

It is another object of the present invention to provide means and methods for shoeing horses which actually is beneficial to the animal's hoofs and contributes materially to correcting foot-faults of the horse as well as curing various physiological conditions of the hoof.

It is also an object of the present invention to provide means and methods of shoeing horses and the like which are simple, economical, and can be utilized without highly specialized equipment, or extensive training.

It is an additional object of the present invention to provide means and methods whereby horses and similar hooved animals can be provided with shoes that are not only much more effective than conventional iron shoes, but also are considerably more comfortable and resilient.

With the above and other objects in view, my invention resides in the novel features of form, construction, arrangement, and combination of parts presently described and pointed out in the claims.

Figure 1:
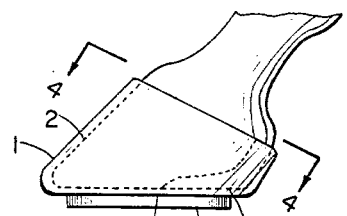
FIG. 1 is a side elevational view of a horse shoe constructed in accordance with and embodying the present invention.
Figure 3:
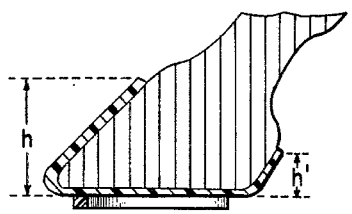
FIG. 3 is a vertical sectional view taken along line 3—3 of FIG. 2.
Figure 2:
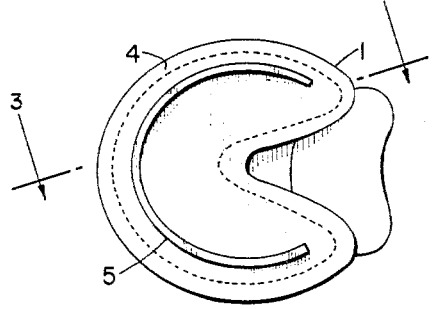
FIG. 2 is a bottom plan view of the horse shoe shown in FIG. 1.
Figure 4:
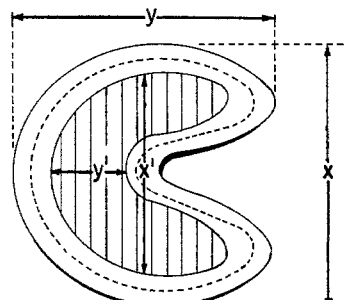
FIG. 4 is a transverse sectional view taken along line 4—4 of FIG. 1.

Broadly speaking, the present invention reads in the discovery that a horse shoe in the form of a hoof-covering or sheath of cup-like shape can be molded from synthetic resin having so-called "heat-shrinkable properties." A number of synthetic resins such as solid polyolefin resins, (e.g. polyethylene), polyvinylchloride resins, neoprene (polymerized chloroprene), tetrafluoroethylene resins, and polyorgano siloxane elastomers can be treated by various conventional methods so as to have heat-shrinkable properties. This is most commonly accomplished by irradiating the resin with a high-voltage electron ionizing discharge which, it is believed, produces cross-linkages within the polymer so that the material can be expanded mechanically to some selected size or shape and will remain in this expanded position until subjected to heat. When heated, the material will shrink and return to the original size and shape. This property is sometimes referred to in the plastics industry as a "memory." Many of these polymers have an inherent memory and do not require irradiation, but may simply be heated, expanded, and allowed to cool in the expanded position. When such polymers are again heated, they will return to their original size and shape. It is also known that in the case of many such co-polymers, heat-shrinkable properties can be obtained by treatment with organic peroxides. Moreover, it has been found, in connection with the present invention, that such resins have a tough rubbery texture which is highly resistant to abrasion and is, therefore, long-wearing and durable when used for the purposes herein set forth.

It has been found in connection with the present invention, that molded shoes made of heat-shrinkable resins will not only shrink when heated, but possess a so-called "memory" which seems to extend from an indefinitely long period of time so that when heat-shrunk around a rigid structural member which is larger in cross-sectional size and shape than the original cross-sectional size and shape to which the plastic tends to return, the plastic will continue to maintain its tendency to return to original size and shape and will exert continued compressive forces upon the structural member. It has been experimentally demonstrated in connection with the present invention that these compressive forces are quite substantial in magnitude. Such materials have been found to have a tensile strength of 1500 p.s.i., will show no brittleness at −80° C., and are resistant to bacteria, oil, solvent acids, alkalis, and the like.

Referring now in more detail and by reference characters to the drawings which illustrate practical embodiments of the present invention, 1 designates a horse-shoe which preferably is geometrically similar to, but approximately 50% smaller in all dimensions than, a horse's hoof. The shoe 1 is then heated to a temperature slightly above its crystalline melting point (i.e. a temperature within the range of 150° F. to 350° F.), and, while being maintained at this elevated temperature, is expanded to an inside diametral size approximately 25% larger than a horse's hoof. In affecting mechanical expansion, reasonable care should be observed to avoid causing any substantial change in the axial height of the shoe 1. In other words, the dimensions $x$, $x'$, and $y$, $y'$, are expanded while the dimensions $h$, $h'$, are maintained substantially constant (reference being made to FIGS. 1 to 4). Immediately following the heat treatment, the shoe 1 is quenched while being mechanically held in its expanded condition. As a result of quenching, the resin crystallizes and remains in the expanded size and shape. The amount of diametral expansion is not particularly critical. It is merely necessary that the finished size of the shoe, after mechanical expansion, be large enough to slip freely over the hoof for which it is intended. Since different horses have hoofs of different sizes, it will, of course, be necessary, commercially, to supply the plastic horse shoe 1 in various sizes just as is the case with shoes for human beings. The wall thickness of the horse shoe 1 is, however, somewhat critical in the sense that if it is too thick, it will make the hoof too bulky, and will exert excessive pressure thereon to the extent of becoming uncomfortable for the horse. On the other hand, if the horse shoe 1 is too thin, it will tend to split upon shrinking and will not wear well.

Actual experiments with irradiating polyvinyl resins intended for the present purpose has indicated that the wall thickness of the annular side wall 2 of the molded shoe 1 should not be appreciably much smaller than $1/8$ in. On the other hand, wall thicknesses as great as $3/16$ in. have been found to be quite satisfactory, but begin to reach overly large proportions in terms of appearance and comfort. The thickness of the flat bottom wall 3 may be as great as $1/2$ in. and is integrally provided upon its under face 4 with a crescent-shaped calk 5.

In shoeing a horse, the cup-like shoe 1 is loosely slipped over the hoof. As above indicated, the internal size thereof is substantially greater than the extreme size of the hoof. The horse shoe 1 is manually shifted so that its axial position coincides properly with the contour of the hoof and, in this assembled relation, the horse shoe 1 and hoof are placed between electric heat-radiators which may be of any conventional type and therefore, are not illustrated or described herein. It is merely necessary that the hoof and horse shoe 1, in effect, be surrounded by and enclosed within a heating zone so that the horse shoe 1 will accordingly be heated from all sides in a substantially uniform manner. Instead of electric heat-radiators, it is also possible to employ an oven, gas fired heating means, hot-air blowers of the hair-dryer type, or infra-red lamps of the type commonly used in industrial tunnel ovens. Irrespective of the particular heating means employed, the horse shoe 1 should be heated again to a temperature slightly above the crystalline melting point and held at this temperature for a period of several minutes. During such period of time, and while held in such temperature range, the horse shoe 1 will shrink into snug tight contour-conformed engagement with the hoof, substantially as shown in FIG. 1. Thereupon, the hoof and horse shoe 1 are removed from the heated zone and allowed to cool gradually at ordinary room temperature. Under such circumstances, the horse shoe 1 will return to the microcrystalline state which it possessed after original extrusion and will exert a desirable degree of compressive force upon the hoof and will remain securely in place until worn out and removed. Horse shoes made in accordance with the present invention have been found to be easy to fit, comfortable for the horse, and durable in use.

Horse shoes made of polyethylene, polypropylene, neoprene, Teflon, and siloxane resins all in approximately the same dimensions above specified, have been found to produce similar satisfactory results. The temperature ranges to which such materials must be heated vary somewhat, but the crystalline melting point in each case is well-known, and can be ascertained from literature or by reference to the manufacturer of such material. Actually, it has been found desirable in stretching the sleeves and in heat shrinking them, to use a temperature which is approximately 10° C. above the crystalline melting point.

Figure 5:
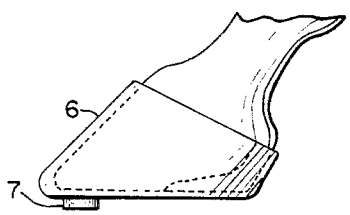
FIG. 5 is a side elevational view of a modified form of horse shoe constructed in accordance with the present invention.
Figure 7:
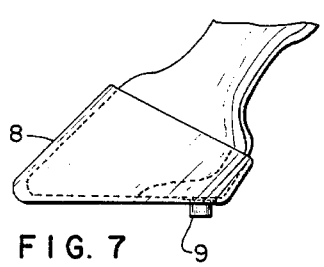
FIG. 7 is a side elevational view of a modified form of horse shoe constructed in accordance with the present invention.
Figure 6:
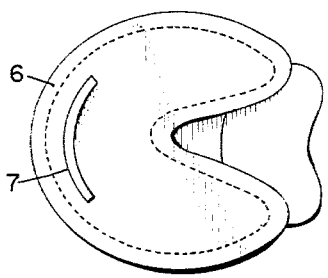
FIG. 6 is a bottom plan view of the horse shoe shown in FIG. 5.
Figure 8:
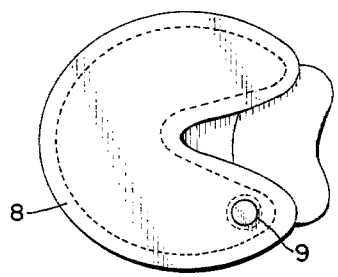
FIG. 8 is a bottom plan view of the horse shoe shown in FIG. 7.
Figure 9:
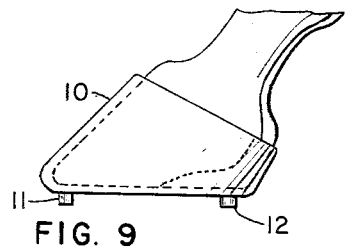
FIG. 9 is a side elevational view of a modified form of horse shoe constructed in accordance with the present invention.
Figure 11:
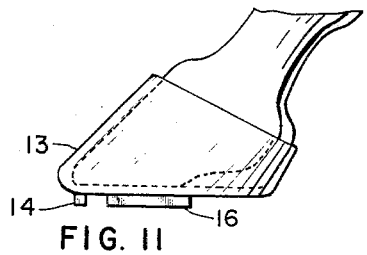
FIG. 11 is a side elevational view of a modified form of horse shoe constructed in accordance with the present invention.
Figure 10:
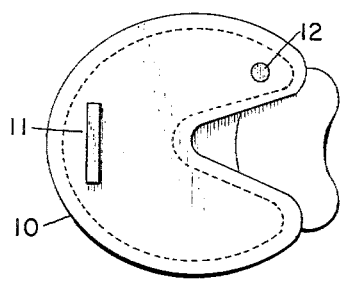
FIG. 10 is a bottom plan view of the horse shoe shown in FIG. 9.
Figure 12:
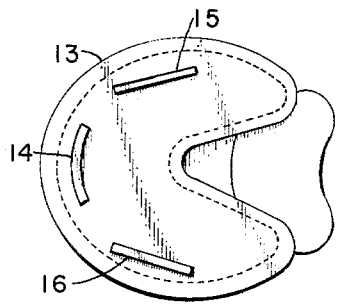
FIG. 12 is a bottom plan view of the horse shoe shown in FIG. 11.
Figure 13:
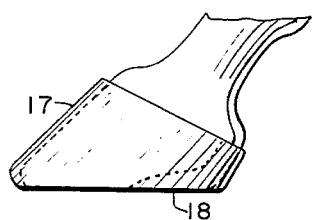
FIG. 13 is a side elevational view of a modified form of horse shoe constructed in accordance with the present invention.
Figure 14:
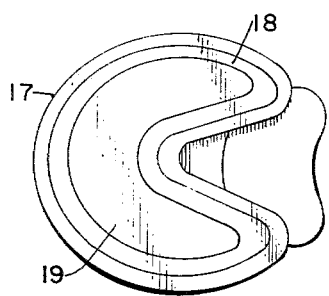
FIG. 14 is a bottom plan view of the horse shoe shown in FIG. 13.

In connection with the present invention, it has also been found possible to provide horse shoes with various types of calks such as the horse shoe 6, shown in FIGS. 5 and 6, having an arcuate toe-calk 7. It is also possible to provide a horse shoe 8 having a heel-calk 9, as shown in FIGS. 7 and 8. Similarly, it is possible to provide a horse shoe 10 having a bar-type toe-calk 11 and heel-calk 12 as shown in FIGS. 9 and 10. Similarly, it is possible to provide a horse shoe 13 having an arcuate toe-calk 14 and bar-type side-calks 15, 16, as shown in FIGS. 11 and 12. It is also possible to provide a horse shoe 17 having an open-bottom 18 and a marginal ring-flange 19 as shown in FIGS. 13 and 14. Such horse shoes can be made of transparent resins or can be pigmented in any colors which may be aesthetically desirable.

Figure 15:
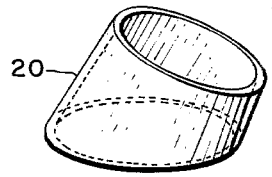
FIG. 15 is a perspective view of a tubular hoof-shield or so-called "quarter boot" constructed in accordance with the present invention.
Figure 16:
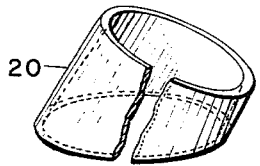
FIG. 16 is a perspective view, partly broken away and in section, of the hoof-shield shown in FIG. 15.

It is also possible to provide a hoof-shield or so-called quarterboot 20 as shown in FIGS. 15 and 16 which has no bottom wall or calks but is heat-shrunk in place in the same manner as above described. This quarterboot 20 can be made in various thicknesses and colors as desired, and can be used to hold gait-correcting weights on the hoof if so desired. Gait-correcting weights are conventional and are, therefore, not shown or described herein.

It should be understood that changes and modifications in the form, construction, arrangement, and combination of the several parts of the horse shoes may be made and substituted for those herein shown and described without departing from the nature and principle of my invention.

Having thus described my invention, what I claim and desire to secure by Letters Patent is:

1. A shoe for horses and similar hooved animals, comprising an open topped cup-like member formed of a heat-shrinkable synthetic resin, having an original shape geometrically similar to, but substantially smaller than, the animal's hoof, and being provided with an under face having a ground-engaging surface, said member being expanded to a size substantially larger than the animal's hoof, so that it can be slipped freely thereover and manually positioned in proper alignment with respect thereto, said cup-like member having a side wall provided with a continuous inner face adapted for continuous perimetral snug fitting embracement with the side face of the animal's hoof and having a cross sectional contour geometrically similar to the cross-sectional shape of the animal's hoof, said cup-like member being reversely indented at the rear to fit snugly within the cleft of the animal's hoof, whereby to fit conformably around and against substantially the entire surface of the side faces of the animal's hoof.

2. A shoe for horses and similar hooved animals, comprising an open topped cup-like member formed of a heat-shrinkable synthetic resin, having an original shape geometrically similar to, but substantially smaller than, the animal's hoof, and being provided with an under face having a ground-engaging surface, said member being expanded, by the application of heat and internal mechanical pressure, to a size substantially larger than the animal's hoof, so that it can be slipped freely thereover and manually positioned in proper alignment with respect thereto, said cup-like member having a side wall provided with a continuous inner face adapted for continuous perimetral snug fitting embracement with the side face of the animal's hoof and having a cross sectional contour geometrically similar to the cross-sectional shape of the animal's hoof, said cup-like member being reversely indented at the rear to fit snugly within the cleft of the animal's hoof, whereby to fit conformably around and against substantially the entire surface of the side faces of the animal's hoof.

3. A shoe for horses and similar hooved animals, comprising an open topped cup-like member formed of a heat-shrinkable synthetic resin, having an original shape geometrically similar to, but substantially smaller than, the animal's hoof, and being provided with an under face having a ground-engaging surface, provided with outwardly projecting calks, said member being expanded to a size substantially larger than the animal's hoof, so that it can be slipped freely thereover and manually positioned in proper alignment with respect thereto, said cup-like member having a side wall provided with a continuous inner face adapted for continuous perimetral snug fitting embracement with the side face of the animal's hoof and having a cross sectional contour geometrically similar to the cross-sectional shape of the animal's hoof, said cup-like member being reversely indented at the rear to fit snugly within the cleft of the animal's hoof, whereby to fit conformably around and against substantially the entire surface of the side faces of the animal's hoof.

4. A shoe for horses and similar hooved animals, comprising an open topped cup-like member formed of a heat-shrinkable synthetic resin, having an original shape geometrically similar to, but substantially smaller than, the animal's hoof, and being provided with an under face having a ground-engaging surface, provided with outwardly projecting integral calks, said member being expanded to a size substantially larger than the animal's hoof, so that it can be slipped freely thereover and manually positioned in proper alignment with respect thereto, said cup-like member having a side wall provided with a continuous inner face adapted for continuous perimetral snug fitting embracement with the side face of the animal's hoof and having a cross sectional contour geometrically similar to the cross-sectional shape of the animal's hoof, said cup-like member being reversely indented at the rear to fit snugly within the cleft of the animal's hoof, whereby to fit conformably around and against substantially the entire surface of the side faces of the animal's hoof.

5. A shoe for horses and similar hooved animals, comprising an open-topped, close-bottom cup-like member formed of a heat-shrinkable synthetic resin, having an original shape geometrically similar to, but substantially smaller than, the animal's hoof, and being provided with an under face having a ground-engaging surface, said member being expanded to a size substantially larger than the animal's hoof, so that it can be slipped freely thereover and manually positioned in proper alignment with respect thereto, said cup-like member having a side wall provided with a continuous inner face adapted for continuous perimetral snug fitting embracement with the side face of the animal's hoof and having a cross sectional contour geometrically similar to the cross-sectional shape of the animal's hoof, said cup-like member being reversely indented at the rear to fit snugly within the cleft of the animal's hoof, whereby to fit conformably around and against substantially the entire surface of the side faces of the animal's hoof.

6. A shoe for horses and similar hooved animals, comprising an open topped cup-like member formed of a heat-shrinkable synthetic resin, having an original shape geometrically similar to, but substantially smaller than, the animal's hoof, said member having a vertical height approximately equal to the vertical height of the animal's hoof, and being provided with an under face having a ground-engaging surface, said member being expanded to a size substantially larger than the animal's hoof, so that it can be slipped freely thereover and manually positioned in proper alignment with respect thereto, said cup-like member having a side wall provided with a continuous inner face adapted for continuous perimetral snug fitting embracement with the side face of the animal's hoof and having a cross sectional contour geometrically similar to the cross-sectional shape of the animal's hoof, said cup-like member being reversely indented at the rear to fit snugly within the cleft of the animal's hoof, whereby to fit conformably around and against substantially the entire surface of the side faces of the animal's hoof.

7. A shoe for horses and similar hooved animals, comprising an open topped cup-like member formed of a heat-shrinkable synthetic resin, having an original shape geometrically similar to, but substantially smaller than, the animal's hoof, and being provided with an under face having a ground-engaging surface, said member being expanded perimetrally to a size substantially larger than the animal's hoof, while preserving its vertical height substantially unchanged, so that it can be slipped freely thereover and manually positioned in proper alignment with respect thereto, said cup-like member having a side wall provided with a continuous inner face adapted for continuous perimetral snug fitting embracement with the side face of the animal's hoof and having a cross sectional contour geometrically similar to the cross-sectional shape of the animal's hoof, said cup-like member being reversely indented at the rear to fit snugly within the cleft of the animal's hoof, whereby to fit conformably around and against substantially the entire surface of the side faces of the animal's hoof.

8. A shoe for horses and similar hooved animals, comprising an open topped cup-like member formed of a heat-shrinkable synthetic resin, of the class consisting of solid polyolefin resins, polyvinylchloride resins, neoprene, tetrafluoroethylene resins, and polyorgano siloxane elastomers, having an original shape geometrically similar to, but substantially smaller than, the animal's hoof, and being provided with an under face having a ground-engaging surface, said member being expanded to a size substantially larger than the animal's hoof, so that it can be slipped freely thereover and manually positioned in proper alignment with respect thereto, said cup-like member having a side wall provided with a continuous inner face adapted for continuous perimetral snug fitting embracement with the side face of the animal's hoof and having a cross sectional contour geometrically similar to the cross-sectional shape of the animal's hoof, said cup-like member being reversely indented at the rear to fit snugly within the cleft of the animal's hoof, whereby to fit conformably around and against substantially the entire surface of the side faces of the animal's hoof.

9. A shoe for horses and similar hooved animals, comprising an open topped cup-like member formed of heat-shrinkable polyethylene, having an original shape geometrically similar to, but substantially smaller than, the animal's hoof, and being provided with an under face having a ground-engaging surface, said member being expanded to a size substantially larger than the animal's hoof, so that it can be slipped freely thereover and manually positioned in proper alignment with respect thereto, said cup-like member having a side wall provided with a continuous inner face adapted for continuous perimetral snug fitting embracement with the side face of the animal's hoof and having a cross sectional contour geometrically similar to the cross-sectional shape of the animal's hoof, said cup-like member being reversely indented at the rear to fit snugly within the cleft of the animal's hoof, whereby to fit conformably around and against substantially the entire surface of the side faces of the animal's hoof.

10. A shoe for horses and similar hooved animals, comprising an open topped cup-like member formed of heat-shrinkable polyvinylchloride, having an original shape geometrically similar to, but substantially smaller than, the animal's hoof, and being provided with an under face having a ground-engaging surface, said member being expanded to a size substantially larger than the animal's hoof, so that it can be slipped freely thereover and manually positioned in proper alignment with respect thereto, said cup-like member having a side wall provided with a continuous inner face adapted for continuous perimetral snug fitting embracement with the side face of the animal's hoof and having a cross sectional contour geometrically similar to the cross-sectional shape of the animal's hoof, said cup-like member being reversely indented at the rear to fit snugly within the cleft of the animal's hoof, whereby to fit conformably around and against substantially the entire surface of the side faces of the animal's hoof.

11. A shoe for horses and similar hooved animals, comprising an open topped cup-like member formed of heat-shrdinkable neoprene, having an original shape geometrically similar to, but substantially smaller than, the animal's hoof, and being provided with an under face having a ground-engaging surface, said member being expanded to a size substantially larger than the animal's hoof, so that it can be slipped freely thereover and manually positioned in proper alignment with respect thereto, said cup-like member having a side wall provided with a continuous inner face adapted for continuous peripheral snug fitting embracement with the side face of the animal's hoof and having a cross sectional contour geometrically similar to the cross-sectional shape of the animal's hoof, said cup-like member being reversely indented at the rear to fit snugly within the cleft of the animal's hoof, whereby to fit conformably around and against substantially the entire surface of the side face of the animal's hoof.

12. A shoe for horses and similar hooved animals, comprising an open topped cup-like member formed of heat-shrinkable tetrafluoroethylene, having an original shape geometrically similar to, but substantially smaller than, the animal's hoof, and being provided with an under face having a ground-engaging surface, said member being expanded to a size substantially larger than the animal's hoof, so that it can be slipped freely thereover and manually positioned in proper alignment with respect thereto, said cup-like member having a side wall provided with a continuous inner face adapted for continuous perimetral snug fitting embracement with the side face of the animal's hoof and having a cross sectional contour geometrically similar to the cross-sectional shape of the animal's hoof, said cup-like member being reversely indented at the rear to fit snugly within the cleft of the animal's hoof, whereby to fit conformably around and against substantially the entire surface of the side faces of the animal's hoof.

13. A shoe for horses and similar hooved animals, comprising an open topped cup-like member formed of heat-shrinkable polyorgano siloxane elastomers, having an original shape geometrically similar to, but substantially smaller than, the animal's hoof, and being provided with an under face having a ground-engaging surface, said member being expanded to a size substantially larger than the animal's hoof, so that it can be slipped freely thereover and manually positioned in proper alignment with respect thereto, said cup-like member having a side wall provided with a continuous inner face adapted for continuous perimetral snug fitting embracement with the side face of the animal's hoof and having a cross sectional contour geometrically similar to the cross-sectional shape of the animal's hoof, said cup-like member being reversely indented at the rear to fit snugly within the cleft of the animal's hoof, whereby to fit conformably around and against substantially the entire surface of the side faces of the animal's hoof.

14. The method of shoeing hooved animals which method comprises forming a cup-like element from a heat-shrinkable synthetic resin, said cup-like element being formed with an original internal peripheral size smaller than the outside peripheral size of the animal's hoof, expanding the cup-like element diametrally to an inside perimetral size larger than the outside peripheral size of the animal's hoof, placing the expanded cup-like element around the animal's hoof, and then heat-shrinking the cup-like element down into snug-fitting embracing engagement around the animal's hoof.

15. The method of shoeing hooved animals which method comprises forming a cup-like element from a heat-shrinkable synthetic resin, said cup-like element being formed with an original internal peripheral size smaller than the outside peripheral size of the animal's hoof, expanding the cup-like element diametrally to an inside perimetral size larger than the outside peripheral size of the animal's hoof, placing the expanded cup-like element around the animal's hoof, and then heat-shrinking the cup-like element down into snug-fitting embracing engagement around the animal's hoof, by the application of heat in the temperature range of 150° F. to 350° F.

16. The method of shoeing hooved animals which method comprises forming a cup-like element from a heat-shrinkable synthetic resin, said cup-like element being formed with an original internal peripheral size smaller than the outside peripheral size of the animal's hoof, expanding the cup-like element, by the application of heat and internal mechanical pressure, diametrally to an inside perimetral size larger than the outside peripheral size of the animal's hoof, placing the expanded cup-like element around the animal's hoof, and then heat-shrinking the cup-like element down into snug-fitting embracing engagement around the animal's hoof.

17. The method of shoeing hooved animals which method comprises forming a cup-like element from a heat-shrinkable synthetic resin, said cup-like element being formed with an original internal peripheral size smaller than the outside peripheral size of the animal's hoof, expanding the cup-like element, by the application of heat and internal mechanical pressure, diametrally to an inside perimetral size larger than the outside peripheral size of the animal's hoof, placing the expanded cup-like element around the animal's hoof, and then heat-shrinking the cup-like element down into snug-fitting embracing engagement around the animal's hoof, by the application of heat in the temperature range of 150° F. to 350° F.

References Cited by the Examiner

UNITED STATES PATENTS

| | | | |
|---|---|---|---|
| 1,218,901 | 3/1917 | Saxton | 168—18 |
| 1,294,896 | 2/1919 | Grant | 168—18 |
| 1,452,317 | 4/1923 | Simon et al. | 168—18 |
| 2,041,538 | 5/1936 | Gash et al. | 168—4 |
| 2,197,166 | 4/1940 | Wheeler et al. | 168—4 |
| 2,446,371 | 8/1948 | Jones | 36—2.5 |
| 2,986,823 | 6/1961 | Kos | 36—7.1 |
| 2,988,828 | 6/1961 | Anderson | 36—2.5 |
| 3,026,635 | 3/1962 | Slade | 36—7.3 |

OTHER REFERENCES

"Polythene," by Renfrew and Morgan Published by Iliffe and Sons Ltd., 1957, TP986 P56 R4, pages 465, 466.

Polyolefin Resin Processes by Marshall Sittig, Pub. Houston, Texas, 1961, TP986 P56 S5 (index only).

SAMUEL KOREN, *Primary Examiner.*

ALDRICH F. MEDBERY, *Examiner.*